United States Patent [19]

Lewis et al.

[11] Patent Number: 5,524,142
[45] Date of Patent: Jun. 4, 1996

[54] METHOD AND APPARATUS FOR THE BILLING OF VALUE-ADDED COMMUNICATION CALLS

[76] Inventors: C. Alan Lewis, P.O. Box 214, Pebble Beach, Calif. 93953-0214; D. Kelly Daniels, P.O. Box 233, Tualahn, Oreg. 97062-0233

[21] Appl. No.: 227,539

[22] Filed: Apr. 14, 1994

Related U.S. Application Data

[63] Continuation-in-part of Ser. No. 146,887, Nov. 2, 1993.
[51] Int. Cl.$^6$ .......................... H04M 15/00; H04M 3/42; H04M 7/00
[52] U.S. Cl. .......................... 379/112; 379/114; 379/115; 379/201; 379/221; 379/127
[58] Field of Search .................................. 379/111, 112, 379/113, 114, 115, 116, 121, 122, 144, 219, 127, 220, 221, 201, 210, 211

[56] References Cited

U.S. PATENT DOCUMENTS

| | | | |
|---|---|---|---|
| 4,191,866 | 3/1980 | Weber | 379/221 X |
| 4,769,834 | 9/1988 | Billinger et al. | 379/112 |
| 5,008,929 | 4/1991 | Olsen et al. | 379/112 |
| 5,146,491 | 9/1992 | Silver et al. | 379/114 |
| 5,148,474 | 9/1992 | Haralambopoulos et al. | 379/114 X |
| 5,179,589 | 1/1993 | Tsumura | 379/114 |
| 5,184,345 | 2/1993 | Sahni | 379/114 X |
| 5,343,517 | 8/1994 | Bogart et al. | 379/221 X |

Primary Examiner—Stephen Chin
Assistant Examiner—Paul Loomis
Attorney, Agent, or Firm—LaRiviere, Grubman & Payne

[57] ABSTRACT

A new method of charging enhanced service provider (ESP) fees on phone bills of telephone numbers originating seven digit 555 number calls within the Public Switched Telephone Network (PSTN). The Local Exchange Carrier routes the call to the PSTN which translates a dialed 7-digit 555 number into a ten-digit phantom routing number and then passes the call to the carrier assigned the ten-digit routing plan. Translation is performed as a look-up in a database, i.e., the Service Management System (SMS). The SMS is used for 800-number translation and was not heretofore available to ESPs. This novel use of PSTN facilities enables the system to provide caller dialed number and billing information on a real-time basis (during call processing). It signals the billing and caller dialed number information in the voice channel (In-Band) during setup of calls to connecting carriers. The ESPs receive the circuit "off-hook" signal (seizure), and two fields of Multi-Frequency Tones, then process the information to collect and validate billing information needed to deny the call or to accept it. If the ESP accepts the call, the caller dialed information is processed to bill or credit the subscriber for the service the caller selected. Using a phantom routing number bridging circuit between the Local Exchange Carriers and the toll carriers in a manner similar to 800 call processing allows the billing information to remain intact through-out the call hand-off from the carriers to the ESP.

25 Claims, 15 Drawing Sheets

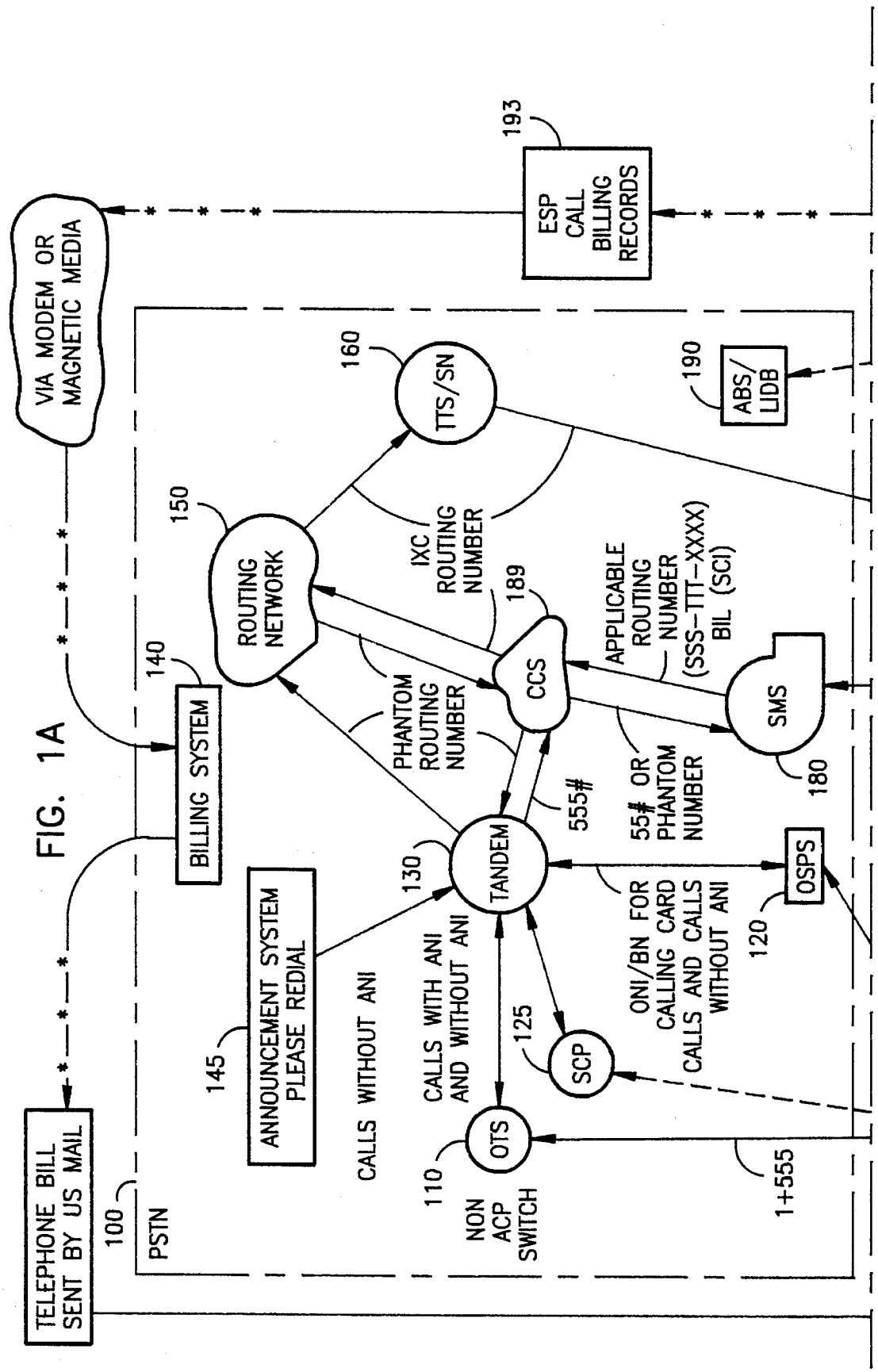

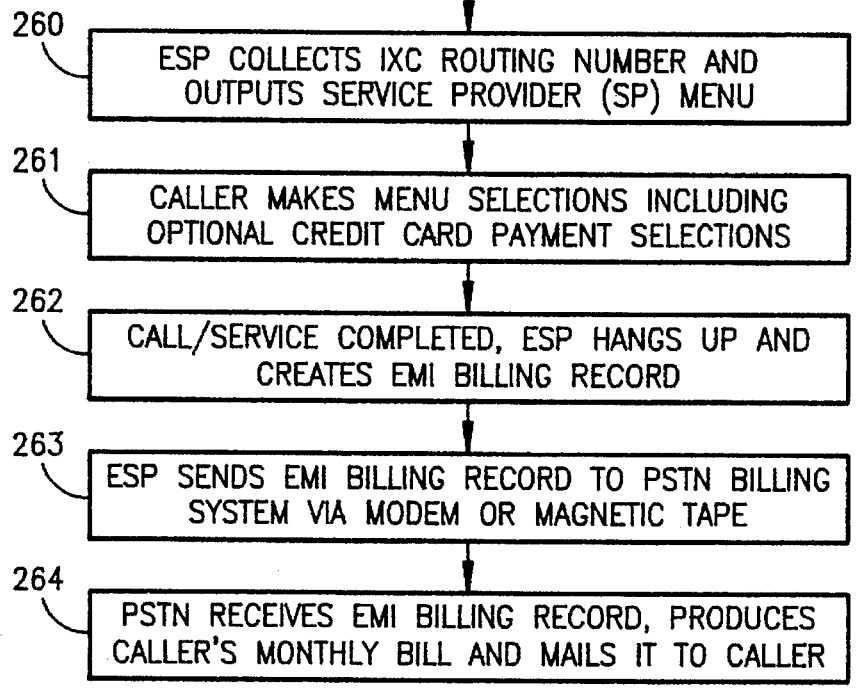

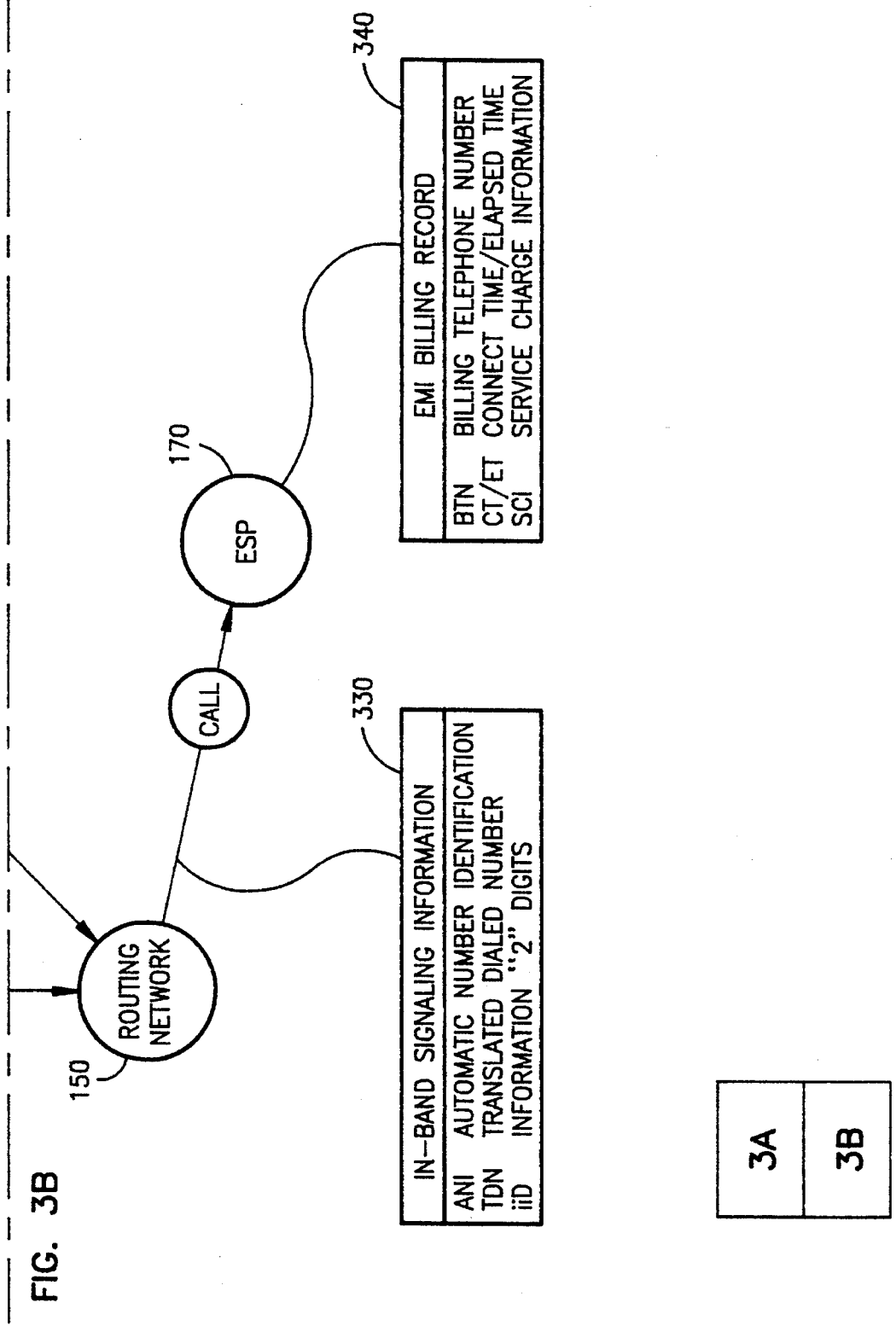

FIG. 4

ESP BILLING RECORD

|     |     |
| --- | --- |
|     | RECORD IDENTIFICATION |
| 431 | DATE OF CALL |
|     | CALLING NUMBER |
|     | DIALED NUMBER |
|     | FREE PERIOD LENGTH |
|     | INITIAL PERIOD LENGTH |
|     | INITIAL PERIOD RATE |
|     | ADDITIONAL PERIOD LENGTH |
|     | ADDITIONAL PERIOD RATE |
|     | RATE MODIFIER |
| 421 | AMOUNT OF CHARGE OR CREDIT |
| 422 | CONNECT TIME |
| 432 | ELAPSED TIME |
|     | METHOD OF RECORDING |
|     | RETURN CODE FROM REGIONAL ACCOUNTING OFFICE |
| 423 | SERVICE NAME/TEXT CODE |
| 424 | RATE PERIOD/CLASS |
| 425 | MESSAGE TYPE |
| 426 | INDICATORS |
|     | SERIAL NUMBER |
|     | BILLING RAO |
| 429 | BILLING TELEPHONE NUMBER |
|     | CALLER LOCATION GEOGRAPHIC NAME |
|     | ESP PRODUCT NAME |
|     | LIBRARY SETTLEMENT/CARRIER CODE |
|     | RE-RATE INFORMATION |
|     | INDICATORS |
|     | LOCAL BILLING COMPANY INFORMATION |
|     | MODULE |
| 427 | TYPE OF ADDITIONAL CHARGE |
| 428 | AMOUNT OF ADDITIONAL CHARGE |

FIG. 5AA

BILLABLE MESSAGE
NORTH AMERICAN ORIGINATED, TERMINATED AND BILLABLE
SPECIALIZED SERVICE/SERVICE PROVIDER CHARGE

RECORD NAME

01

CATEGORY

| POS. | FIELD DESCRIPTION | | | CHAR. |
|---|---|---|---|---|
| 1 | CATEGORY | RECORD IDENTIFICATION | | 9 |
| 2 | CATEGORY | RECORD IDENTIFICATION | | |
| 3 | GROUP | RECORD IDENTIFICATION | | |
| 4 | GROUP | RECORD IDENTIFICATION | | |
| 5 | RECORD TYPE | RECORD IDENTIFICATION | | |
| 6 | RECORD TYPE | RECORD IDENTIFICATION | | |
| 7 | YEAR | DATE OF RECORD | | 9 |
| 8 | YEAR | DATE OF RECORD | | |
| 9 | MONTH | DATE OF RECORD | | |
| 10 | MONTH | DATE OF RECORD | | |
| 11 | DAY | DATE OF RECORD | | |
| 12 | DAY | DATE OF RECORD | | |
| 13 | FROM NUMBER LENGTH | | | 9 |
| 14 | FROM NUMBER LENGTH | | | |
| 15 | NPA | TO NUMBER | TO BASE STATION NUMBER | 9 |
| 16 | NPA | TO NUMBER | TO BASE STATION NUMBER | |
| 17 | NPA | TO NUMBER | TO BASE STATION NUMBER | |
| 18 | NXX | TO NUMBER | TO BASE STATION NUMBER | |
| 19 | NXX | TO NUMBER | TO BASE STATION NUMBER | |
| 20 | NXX | TO NUMBER | TO BASE STATION NUMBER | |
| 21 | LINE NUMBER | TO NUMBER | | |
| 22 | LINE NUMBER | TO NUMBER | | |
| 23 | LINE NUMBER | TO NUMBER | | |
| 24 | LINE NUMBER | TO NUMBER | | |
| 25 | OVERFLOW DIGITS | | | 9 |
| 26 | OVERFLOW DIGITS | | | |
| 27 | OVERFLOW DIGITS | | | |
| 28 | TO NUMBER LENGTH | | | 9 |
| 29 | TO NUMBER LENGTH | | | |

| | | | | | |
|---|---|---|---|---|---|
| 30 | NPA | TO NUMBER | TO BASE STATION NUMBER | | 9 |
| 31 | | | | | |
| 32 | | | | | |
| 33 | NXX | | | | |
| 34 | | | | | |
| 35 | | | | | |
| 36 | LINE NUMBER | | | | |
| 37 | | | | | |
| 38 | | | | | |
| 39 | | | | | |
| 40 | $ | CHARGE OR AMOUNT COLLECTED (OR CREDITED) | | | 9 * |
| 41 | | | | | |
| 42 | | | | | |
| 43 | | | | | |
| 44 | ¢ | | | | |
| 45 | | | | | |
| 46 | MILL | | | | |
| 47 | RESERVED | | | | 9 * |
| 48 | $ | STATE TAX | $ | OTHER LINE/ SURCHARGE | $ | TOTAL MODULE TAX AND SURCHARGE | 9 * |
| 49 | | | | | |
| 50 | ¢ | | | | |
| 51 | | | ¢ | | |
| 52 | $ | LOCAL TAX | WATS CLASS | ¢ | |
| 53 | ¢ | | | | |
| 54 | | | ORIG WATS BAND | | |
| 55 | HR | CONNECT TIME | | | 9 |
| 56 | | | | | |
| 57 | MIN | | | | |
| 58 | | | | | |
| 59 | SEC | | | | |
| 60 | | | | | |
| 61 | | BILLABLE OR REPORTED TIME | | | 9 |
| 62 | MIN | | | | |
| 63 | | | | | |
| 64 | | | | | |
| 65 | SEC | | | | |
| 66 | | | | | |
| 67 | 1/10 | | | | |

FIELD CHARACTERISTIC

9 = NUMERIC
X = ALPHANUMERIC

01
---
GROUP

| POS. | FIELD DESCRIPTION | CHAR. | |
|---|---|---|---|
| 68 | METHOD OF RECORD | | 9 |
| 69 | | | |
| 70 | RETURN CODE | CANCEL CODE | 9 |
| 71 | | | |
| 72 | FROM RAO | | 9 |
| 73 | | | |
| 74 | | | |
| 75 | RESERVED | | 9 * |
| 76 | | | |
| 77 | SERVICE NAME/SERVICE TEST CODE IND. | | 9 * |
| 78 | RATE PERIOD | | 9 |
| 79 | RATE CLASS | | 9 |
| 80 | MESSAGE TYPE | | 9 |
| 81 | IOC CODE | TERM WATS BAND | 9 |
| 82 | 1 | | |
| 83 | 2 | | |
| 84 | 3 | | |
| 85 | 4 | | |
| 86 | 5 | | |
| 87 | 6 | | |
| 88 | 7 | | |
| 89 | 8 | | |
| 90 | 9 | | |
| 91 | 10 | INDICATORS | 9 |
| 92 | 11 | | |
| 93 | 12 | | |
| 94 | 13 | | |
| 95 | 14 | | |
| 96 | 15 | | |
| 97 | 16 | | |
| 98 | 17 | | |
| 99 | 18 | | |
| 100 | 19 | | |
| 101 | 20 | | |

| # | | | | | | |
|---|---|---|---|---|---|---|
| 102 | OPERATOR UNIT | | | | | |
| 103 | | | | | | |
| 104 | RECORDING POINT IDENTIFICATION (AMA) | | SERIAL NUMBER | | | 9 |
| 105 | | | | | | |
| 106 | | | | | | |
| 107 | | | | | | |
| 108 | | | | | | |
| 109 | | | | | | |
| 110 | BILLING RAO | | | | | 9 |
| 111 | | | | | | |
| 112 | | | | | | |
| 113 | BILLING NUMBER NORTH AMERICAN STANDARD | | BILLING NUMBER NON STANDARD | | | X |
| 114 | | | | | | |
| 115 | | | | | | |
| 116 | | | | | | |
| 117 | | | | | | |
| 118 | | | | | | |
| 119 | | | | | | |
| 120 | | | | | | |
| 121 | | | | | | |
| 122 | | | | | | |
| 123 | | | NORTH AMER. FROM PLACE | OVER-SEES FROM PLACE AND COUN-TRY | FROM SHIP NAME | CDAR NO. |
| 124 | $ | COIN TARIFF AMT | | | | |
| 125 | | | | | | |
| 126 | ¢ | | | | | |
| 127 | | | | | | |
| 128 | $ | COIN FED TAX | | | | |
| 129 | | | | | | X |
| 130 | ¢ | | | | | |
| 131 | | | | | | PSEUDO TRUNK NO. (SFG) |
| 132 | SSAS CODE | | N.A. FROM STATE | | | |
| 133 | | | | | | |
| 134 | CNCRCD. | | | | | |

18
RECORD TYPE

| POS. | FIELD DESCRIPTION | | CHAR. |
|---|---|---|---|
| 135 | SERVICE NAME | SERVICE TEXT CODE | X * |
| 136 | | | |
| 137 | | | |
| 138 | | | |
| 139 | | | |
| 140 | | | |
| 141 | | | |
| 142 | | | |
| 143 | | | |
| 144 | | | |
| 145 | | | |
| 146 | | | |
| 147 | LIBRARY CODE | | X |
| 148 | | | |
| 149 | SETTLEMENT CODE | | X |
| 150 | CARRIER IDENTIFICATION | | 9 |
| 151 | | | |
| 152 | | | |
| 153 | RERATE INFORMATION | | 9 |
| 154 | | | |
| 155 | | | |
| 156 | | | |
| 157 | | | |
| 158 | 21 | INDICATORS | 9 |
| 159 | 22 | | |
| 160 | 23 | | |
| 161 | 24 | | |
| 162 | 25 | | |
| 163 | 26 | | |
| 164 | 27 | | |
| 165 | 28 | | |
| 166 | 29 | | |
| 167 | 30 | | |

| 168 | | |
|---|---|---|
| 169 | | |
| 170 | RESERVED FOR LOCAL COMPANY USE | 9 |
| 171 | | |
| 172 | | |
| 173 | | |
| 174 | | |
| 175 | | |

FIG. 5AF

| 5AA | 5AC | 5AE |
|---|---|---|
| 5AB | 5AD | 5AF |

FIG. 5B

RECORD DESCRIPTION

| 01 | 01 | 18 |
|---|---|---|
| CATEGORY | GROUP | RECORD TYPE |

CATEGORY 01: BILLABLE MESSAGE

GROUP 01: NORTH AMERICAN ORIGINATED, TERMINATED AND BILLABLE

REC. TYPE 18: SPECIALIZED SERVICE/SERVICE PROVIDER CHARGE

<u>USE OF RECORD:</u>

THIS RECORD IS USED TO BILL CHARGES ASSOCIATED WITH A MISCELLANEOUS SERVICE FOR WHICH NO OTHER RECORD TYPE HAS BEEN DEFINED.

| HEADERS/TRAILERS: | CMDS: | LOCAL: |
|---|---|---|
| 20-20-01/02 | Y | Y |
| 20-21-01/02 | N | Y |
| 20-22-01/02 | Y | Y |
| 20-22-03/04 | Y | Y |

<u>SPECIAL CONSIDERATIONS:</u>

- THE "SERVICE NAME/SERVICE TEXT CODE INDICATOR" IS IN POSITION 77. THIS INDICATOR DESIGNATES WHETHER THE RECORD CONTAINS A "SERVICE NAME" OR A "SERVICE TEXT CODE".

- THE "SERVICE NAME" IS IN POSITIONS 135-146.

- THE "SERVICE TEXT CODE" IS IN POSITIONS 135-139.

METHOD AND APPARATUS FOR THE BILLING OF VALUE-ADDED COMMUNICATION CALLS

This is a continuation-in-part of our prior copending application Ser. No. 08/146,887, filed Nov. 2, 1993.

FIELD OF THE INVENTION

The present invention relates to telephone systems and, more particularly, to a new billing and collection system employing the dialing of the 555 information numbering group for Enhanced Service Providers.

BACKGROUND OF THE INVENTION

Processing of telephone calls in the Public Switched Telephone Network (PSTN) in the United States is controlled by two entities: Local Exchange Carriers (LEC), and toll carriers or interexchange carriers (IXCs). LECs process calls to and from their local telephone subscribers, while IXCs process calls for callers who are dialing long distance. There are approximately 1,400 LECs, and 700 IXCs. The terms "LEC" and "IXC" are beginning to be replaced by the terms "AP" and "AC". "AP" means Access Providers, and is synonymous with "LEC". "AC" means Access Customers, and is synonymous with "IXC".

In recent years, additional telephone-delivered services are being provided by entities referred to as Information Providers (IP). The IP industry was born in 1980 when AT&T (American Telephone and Telegraph Co.) and American Broadcasting Corporation established a telephone line to receive "votes" on the winner of a presidential debate between Jimmy Carter and Ronald Reagan. Enterprising entrepreneurs soon began to exploit the business potential of these new telephone lines. An IP is a business entity that provides services that supplement the plain local and long distance telephone service provided by the LECs and the IXCs. The services provided by an IP are paid for by the telephone caller or subscriber, usually on a pay-per-call basis. Typically, the subscriber dials an IP number having a 900 or a 976 area code, and the charges appear on the subscriber's telephone bill by way of a system known as a Billing and Collection (B&C) system. Typically, services provided by the pay-per-call IPs are in the nature of "audio-tex" information supplied in response to voice-mail-style accessing. In addition to taking public-opinion polls, pay-per-call Ips may provide information on a wide variety of subjects such as: psychic hotline readings, sports information, entertainment information, and the like.

A well known problem plaguing the IP industry is the taint associated with calling a 900 number. The 900/976 pay-per-call B&C system has suffered widespread public-image damage through past abusive use by unscrupulous and/or pornography-peddling IPs. Therefore, the Federal Communities Commission (FCC) has mandated that any business or residential subscriber refusing to pay a 900/976 charge cannot have their phone service disconnected, and may order their phone service blocked from initiating calls to these prefixes.

These developments have resulted in problematic availability of certain billing/account information needed to charge callers for delivery of value-added service.

Another result is that Service Providers (SPs) cannot receive a totally nationwide ("ubiquitous") generic connection from any carrier which contains the information that SPs need to process the call during set up, (i.e., in real-time) in order to prevalidate the billing information as a prerequisite to terminating the call as unbillable, or continuing the call as billable and provide a revenue-generating value-added service.

Further, in order to limit services to only those telephone subscribers for whom service fees can be charged to the subscriber's telephone bill, service requests made from a pay phone, a prison, a hospital, a hotel, or other such "non-billable" telephone subscriber must be sent a message that the request cannot be fulfilled. There is a two-digit code that identifies these non-billable telephone facilities which permits call interruption to avoid creating an un-collectible transaction. Thus, billing information and called number information must be delivered to the SP during call processing and in one transaction. The PSTN does not fulfill this requirement because the LECs and IXCs each possess incomplete information which cannot currently be made complete by SPs due to the circuits being separate and therefor unable to transport the needed information to the SPs through the IXC's network.

Another problem that presented itself was that upon examination of possible sub-circuit designs deployable at the discretion of a LEC, it was learned that any sub-circuit design deployed through one LEC within the PSTN will not be ubiquitous throughout the network, i.e., deployment would need to be negotiated with each individual LEC to gain access to all portions of the network. Thus, there is a need for a sub-circuit design for SP use of 555 numbers deployable through just one IXC to gain national access to the PSTN that is also free from any requirement for Integrated Service Digital Network (ISDN) or other parallel circuit such as that shown in U.S. Pat. No. 5,003,584 to Benyacar et al.

Accordingly, there is a need for a new discrete dialed-number segment and a new value-added B&C signaling system for use only by reputable SPs such as responsible business and professional organizations. These organizations need to provide on-demand access to product/service information by their associates and clients on a "fee-for-service-rendered" basis, with applicable service charges added to the service-recipient's phone bills.

The present invention is the result of ten months of research and development to devise a way to open a new segment of the telephone circuit to an SP sensitive to, and wishing to avoid the "guilt by association" stigma of using 900/976 numbers. The research encompassed examination of all telephone industry systems and tariffs, both existing and planned.

During the research, it was discovered that an industry group called the 555-XXXX Line Number Guidelines Task Group, was in the process of opening the 555-group for number assignments to SP businesses in addition to the traditional 555-1212 use for telephone-number look-up. This task group is preparing a document entitled "555-NXX Assignment Guidelines". Historically, telephone-number look-up services evolved from similar-but-separate functions of the LEC networks. Therefore, the 555-number system lacks nationwide ("ubiquitous") signaling of B&C information from one LEC to another. When 555-1212 calls were processed, generally only a peg count or tally of the calls (no call length) was kept by the local end office, and the tally was not transmitted to the far end. Consequently, it was obvious to the present inventors that any national SP use of the 555-number group in the Public Switched Telephone Network (PSTN) would require a new B&C sub-circuit design. Nationwide deployment of any new B&C sub-circuit design within the PSTN circuit, as mandated by the Federal Communications Commission (FCC) Open Network Architecture (ONA) could be accomplished only through each and every one of the 1400 LECs, or, conversely, through only one of the 700 IXCs.

AT&T (American Telephone & Telegraph Co.) has patented a technology that is referred to as MultiQuest in U.S. Pat. No. 5,187,710. It is for use by 900/976 number service providers at only those locations licensed and equipped to use AT&Ts ISDN (Integrated Services Digital Network) Primary Rate Interface. A service of MultiQuest, trademarked Vari-A-Bill, is an addition to ISDN capabilities. The Vari-A-Bill system allows the licensee's equipment to signal price changes to the AT&T network over a separate channel while a call to the 900-number is in progress. Five flexible options may be invoked: 1.) Free call. No charge for the entire call. 2.) Flat Charge. The price of the call is fixed at a set fee. 3.) New Rate. The per minute rate can be changed upward and downward. 4.) Premium charge. This would be a flat charge added to the per minute rate. 5.) Premium credit. This refers to a flat amount to be deducted from the total price of the call. The total price would not go below $0.

Heretofore, without ISDN or the teachings found in Benyacar, U.S. Pat. No. 5,003,584, the needed billing account information was only able to be assembled from several disparate sources after the call was completed (too late to deny unbillable services.).

DISCLOSURE OF INVENTION

In accordance with the present invention, there is provided means for assembling and signaling the billing information and caller-dialed-number information to the ESP in the voice channel during call setup to connecting carriers. The ESP is able to utilize the billing information and the caller-dialed-number information for making the decision to deny a call requesting the service information. This enables the ESP to limit services to only those callers for whom service fees can be charged to the caller's telephone bill.

A novel feature of this invention is the method of establishing a Bridge-Circuit between the call-originating LEC 7-digit dialing side of the PSTN routing system, and the disparate long-distance call-delivery IXC 10-digit dialing side. The Bridge-Circuit enables a 7-digit call (i.e., 555-XXXX) to be delivered, complete with caller identification (ID) and call billing information, across the PSTN as though it were a 10-digit number (i.e., 800-XXX-XXXX).

A bridge-circuit is required to permit a value-added ESP to use a locally-dialable 7-digit 555-XXXX number in a nationwide (i.e., ubiquitous) application. The SP needs the call billing information during call set up (i.e., in real-time) to be able to terminate unbillable calls prior to providing any service.

An SP orders a locally dialable 7-digit number designated for national deployment, and subsequently orders an unpublished 10-digit number from an IXC, for which no end-user equipment connection is ordered. The 10-digit number becomes a phantom number (PN) unable to be direct-dialed by an end user. The bridge-circuit is established when the SP orders software "pointers" to the PN installed in the PSTN Service Management System (SMS) data base useful for, among other applications, storing records to be accessed in routing calls from an originating call switch (i.e., LEC) to a terminating toll switch (TTS).

In operation, when a caller dials an SP's nationally deployed 7-digit number through the LEC, the LEC queries its side of the SMS or alternatively a Signal Control Point (SCP) that points the query to the PN, and the SMS sends the PN's call-routing instructions back to the LEC. The LEC then delivers the call, the caller ID, and the LEC routing instructions to the routing network. The routing network in turn queries its side of the SMS that points the query to the PN, and the SMS sends the PN's assigned terminating toll switch (TTS) and ESP location identification back to the routing network; whereupon the routing network sends the call, and the caller ID to the ESP through the Inband Equal Access Signaling Interface (IEASI) in a manner synonymous with, but not requiring, Presubscription in accordance with the Federal Communications Commission (FCC) mandated Open Network Architecture (ONA).

BRIEF DESCRIPTION OF THE DRAWING

In the drawing,

FIGS. 1a, 1b and 1c show, in block diagram form, an illustrative PSTN useful in describing the operation of the present invention;

FIGS. 2a, 2b and 2c show a call flow diagram of the operation of the billing system and the PSTN in accordance with the operation of the present invention;

FIGS. 3a and 3b describe the Bridge-Circuit mechanism by which the end-user dialed number is translated by PSTN carriers and delivered to ESPs;

FIG. 4 lists the data fields of the ESP billing records;

FIGS. 5aa–af show SR STS-000320, a typical Exchange Message Interface (EMI) billing record used to bill callers for calls made over the PSTN network; and FIG. 5b is a typical Record Description form used with the billing record of FIGS. 5aa–af.

GENERAL DESCRIPTION

Figure 1B:
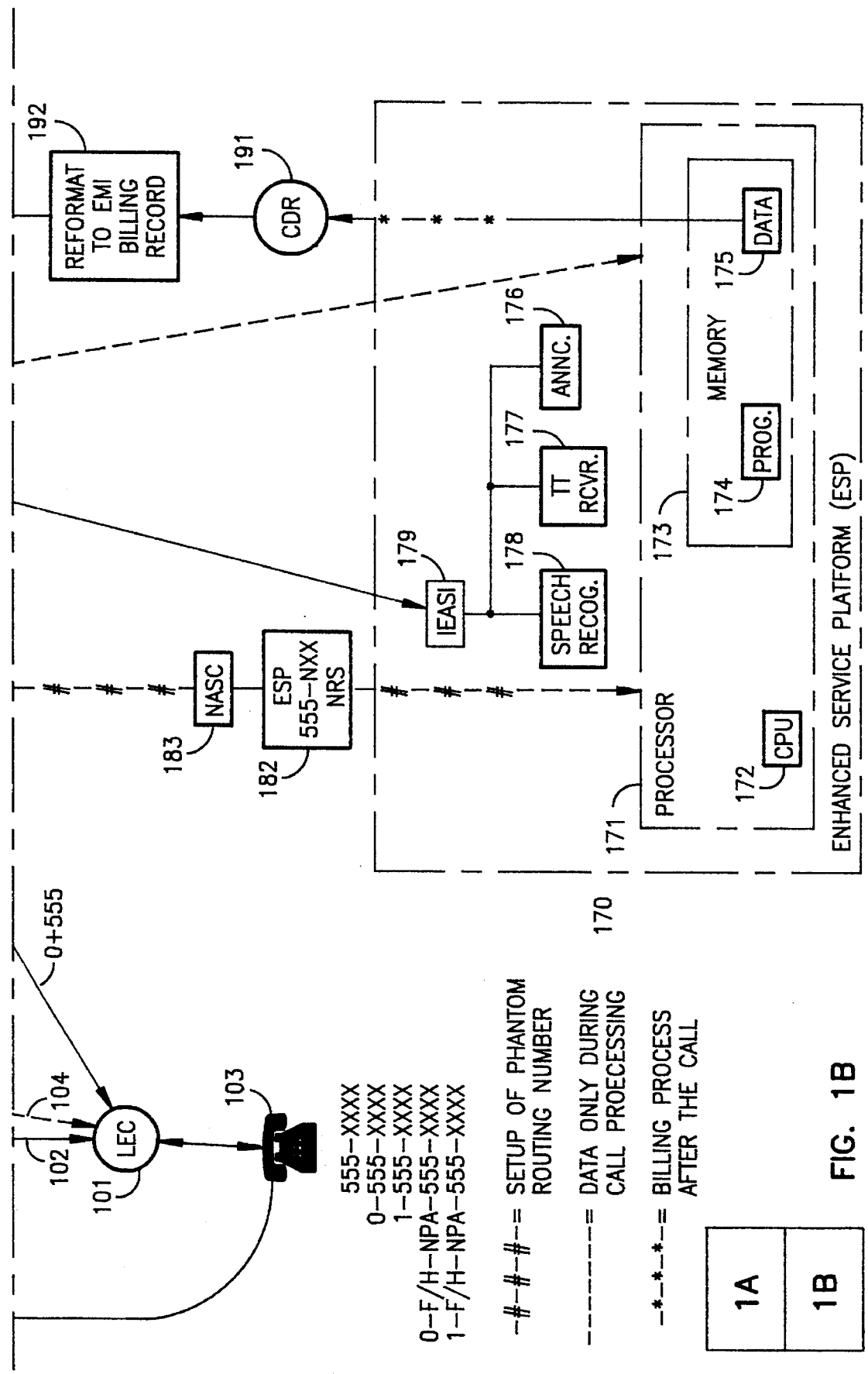

Preceding delineation of the operating description of the inventive method and apparatus for billing value-added communication calls, it is important to note that the apparatus and method of the invention is compatible with all known variations of telco-supplier equipment currently in use within the PSTN configuration shown in FIG. 1. Since the various systems shown in FIG. 1 utilize a variety of hardware and programming techniques, no attempt is made to describe the existing programs used to control these various systems. However, using the following description as a guide, the operations of the present invention should be integrated into the control structure of the various systems of FIG. 1, and function compatibly with other features and operations of those systems. Thus, in order to avoid confusion and enable those skilled in the art to practice the claimed invention, this specification will describe the operation of the present invention using the network block diagram of FIG. 1, the call flow diagrams of FIGS. 2 and 3, the ESP billing record shown in FIG. 4, the Exchange Message Interface (EMI) shown in FIG. 5; and the Record Description shown in FIG. 6. In the following description, the first digit of an element's reference number designates the figure where the element is located (e.g., 101 is located in FIG. 1).

With reference to FIG. 1, there is illustrated a block diagram of a well-known switching network configuration useful in describing the operation of the present invention. The drawing illustrates a Local Exchange Carrier (LEC) 101 and the Public Switched Telephone Network (PSTN) 100. The LEC 101 serves telephone station 103, and enables this station to complete calls to other stations (not shown) of the network in a well-known manner. The PSTN 100 also enables station 103 to access value-added services provided by Service Providers (SP) via equipment such as enhanced service platform (ESP) 170 connected to PSTN 100. The ESP 170, using In-band Equal Access Signaling Interface (IEASI) 179, may connect directly to the PSTN 100. The IEASI 179 is described in a Bellcore document entitled "Bell Operating Companies Notes on the Local Exchange Carrier Network," Section 6, March 1991.

The PSTN 100, illustratively, may comprise Originating Toll Switch (OTS) 110, Operator Services Position System (OSPS) 120, Signal Control Point (SCP) 125, Access, TOPS, or Inter Tandem (Tandem) 130, billing system 140, routing network 150, Terminating Toll Switch (TTS)/Service Node (SN) 160, Service Management System (SMS) 180 and Recorded Announcement System (RCAN) 145. The structure and general operation of a Tandem and SMS is described in a Bellcore document entitled "Bell Operating Companies Notes on the Local Exchange Carrier Network", 1990, Section 14, and in the technical paper "NASC Rules & Responsibilities" presented by Kathy Gains of Data Services Management, Inc. (DSMI) at the Industry Numbering Committee Meeting of the Alliance for Telephone Industry Solutions, in Orlando, Fla. on Mar. 2, 1994. The operation of SMS 180 is also described, for example, in Bellcore Digest Technical References and Bellcore Guidelines for 800 Data Base. These documents are incorporated herein by reference.

While LEC 101 is shown, illustratively, to connect via facility 102 to OTS 110 in FIG. 1, it may equivalently also connect directly to Tandem 130. Thus, OTS 110, and Tandem 130 are points in PSTN 100 which usually interface to other networks (e.g., LEC) or may directly connect to telephone stations (e.g., 103). Since some OTS 110, in our example, do not contain SMS 180 integrating software, they are not considered a common channel signaling (CCS) 189 switch. Consequently, some calls originated through OTS 110 must be directed to a toll switching office having CCS 189 software. The Tandem 130 is characterized as having a CCS 189 network connection to centralized data bases referred to as a SMS. Some LECs may, for business reasons route calls via facility 104 to the Tandem 130 through an alternative data base such as a SCP 125 instead of utilizing a SMS 180, however, for purposes of explanation these data bases are referred to interchangeably as SMS.

The changes in the operation of SMS 180 to perform the functions of the present invention are uploaded to the SMS by the National Assignment Service Center (NASC) 183 administrative clerk upon receipt of relational data base software update sent by the administrator of the Enhanced Service Provider 555-number National Routing System (ESP 555-NXX NRS) 182. The ESP 555-NXX NRS 182 is the centralized data base maintained for the purpose of assigning and administering access and routing codes integral to establishing and implementing said phantom-number bridging circuits as described in this specification.

The CCS 189 direct signaling facilities which link Tandem 130 and SMS 180 are, basically, a packet switching system for routing messages in accordance with their address data contents. CCS 189 network features are disclosed in the February, 1978 Bell System Technical Journal, (BSTJ) No. 2 and in W. B. Smith, et al., U.S. Pat. No. 3,624,613 of Nov. 30, 1971.

An illustrative OSPS 120 is described in the article written by N. X. DeLessio, et al.: "An Integrated Operator Services Capability for the 5ESS Switching System", International Switching Symposium, (Florence), Session 22C, Paper 3, pp. 1–5, May, 1984.

It should be noted that the structural details of LEC 101, toll office OTS 110 and the OSPS 120 form no part of the present invention and are only described herein to the extent necessary for an understanding of the invention.

LEC 101 may be, illustratively, a 5ESS (electronic switching system). The 5ESS is extensively described by K. E. Martersteck, et al., in AT&T Technical Journal, Volume 64, No. 6, part 2, pp. 1305–1564, July/August, 1985. The above-identified disclosures and the citations referred to therein may be consulted for a complete understanding of the construction and operations of a typical toll office.

The OTS 110, Tandem 130 and TTS/SN 160 may be, illustratively, an electronic program-controlled telephone system of the No. 4ESS design as described by A. E. Ritchie, et al., in the Bell System Technical Journal, (BSTJ), September, 1977, Volume 56, No. 7.

In accordance with the present invention, in-band signaling circuits are used for communication between the caller at telephone station 103 and the called location ESP 170, while Equal Access Signaling (EAS) protocol is used for communicating signaling and control messages including caller identification and billing information between network 100 and ESP 170. EAS protocol is described in a Bellcore document entitled "Bell Operating Companies Notes on the Local Exchange Carrier Network," 1990, section 6 which is incorporated herein by reference.

The SP may provide any of a variety of well-known services such as information database service, consulting service, marketing service, etc. on an ESP 170. The ESP 170 may typically include a processor 171 comprising Central Processor Unit (CPU) 172 and memory 173 including program memory 174 and data memory 175. The ESP 170 may, illustratively, be part of or an adjunct to a Private Branch Exchange (PBX), not shown. Program memory stores the program required to manage the various services provided by ESP 170 including the interactions with the caller. The data memory 175, illustratively shown as part of processor 171, contains an operational billing database as well as the information databases required to provide the various services provided by ESP 170. Alternatively, data memory 175 may be part of a data base system (not shown) which is accessible by processor 171. Announcement circuit 176 provides the various announcements used by ESP 170 to output the menu to the caller and to interact with the caller. The touch-tone receiver 177 enables the detection of user touch tone inputs in response to voice announcement inquiries outputted to the user by ESP 170. The speech recognizer 178 enables ESP 170 to determine a caller voice response to system inquiries.

In accordance with the present invention, the Alternate Billing Service/Line Information Data Base (ABS/LIDB) 190 is accessed in real-time (i.e., during receipt of billing and called number information) to validate the ESP's ability to bill the calling number or terminate unbillable calls.

The Call Detail Record (CDR) 191 which is present in every key system or PBX, the Reformat to EMI Billing Records 192, and the Call Billing Records 193 form no part of the present invention and are only described herein to the extent necessary for an understanding of the invention.

DETAILED DESCRIPTION

In accordance with the method and apparatus of the present invention, when a customer (e.g., caller at station

103, FIG. 1) dials a value-added call to an SP number, the call is routed to an ESP 170 location and any SP-specified charges incurred during the call are separately determined for each call and included in the EMI billing record 192, FIG. 5. The SP-specified charges are incurred for value-added services provided by the SP during the call. The SP-specified charges are determined using SP-designated call billing parameters which may change substantially in real time by the caller's selection.

The present invention enables the SP at ESP 170 to selectively specify call billing parameters which specify the caller charges. These SP-specified caller charges are transported on a call-by-call basis from ESP 170 via modem or tape delivery to the billing system 140, as illustrated in FIG. 1. The billing system 140 recognizes and processes the SP-specified charges for inclusion in the network bill to the customer (caller), as shown as "telephone bill sent by mail" in FIG. 1.

Figure 2A:
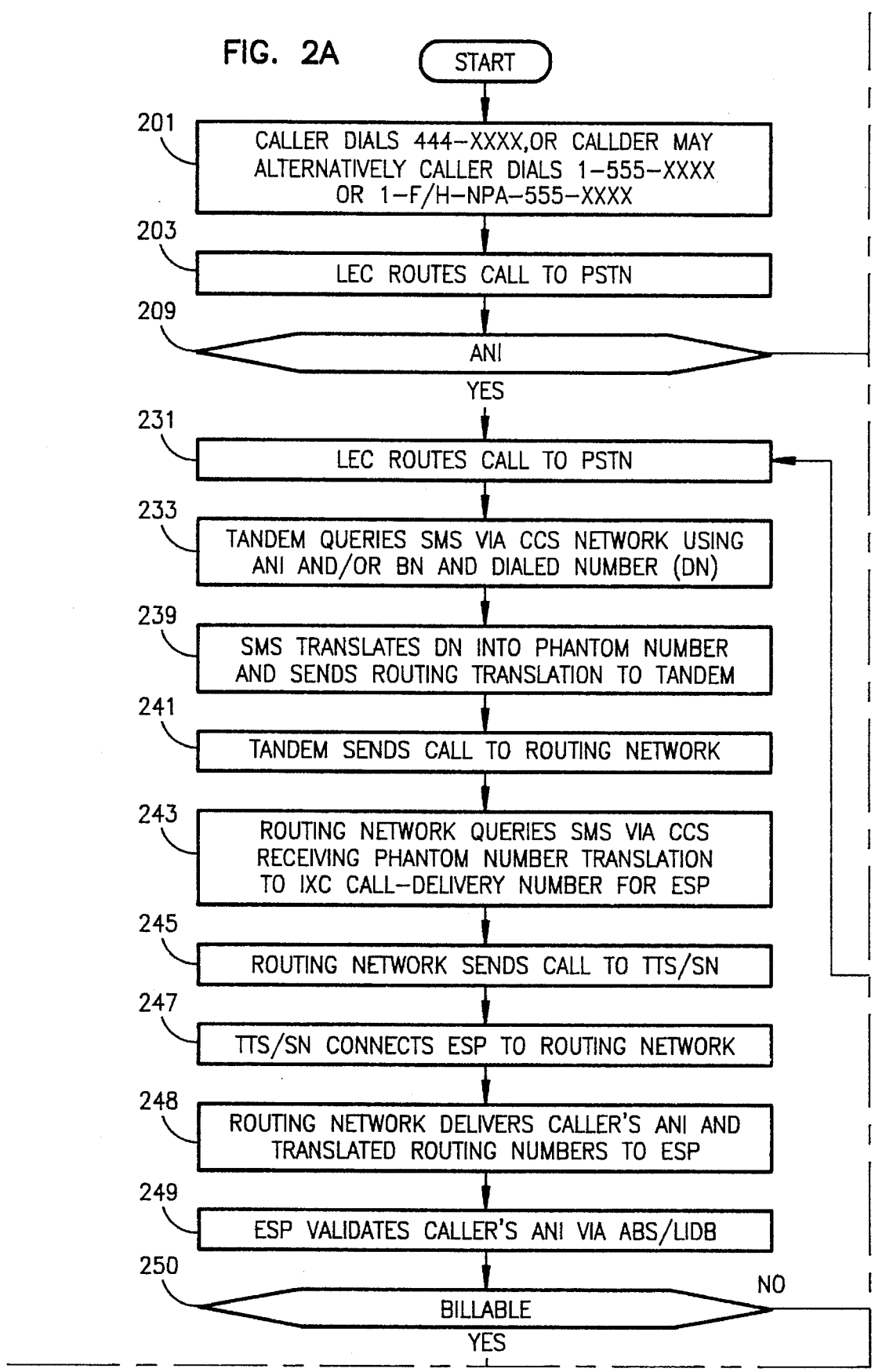
Figure 2B:
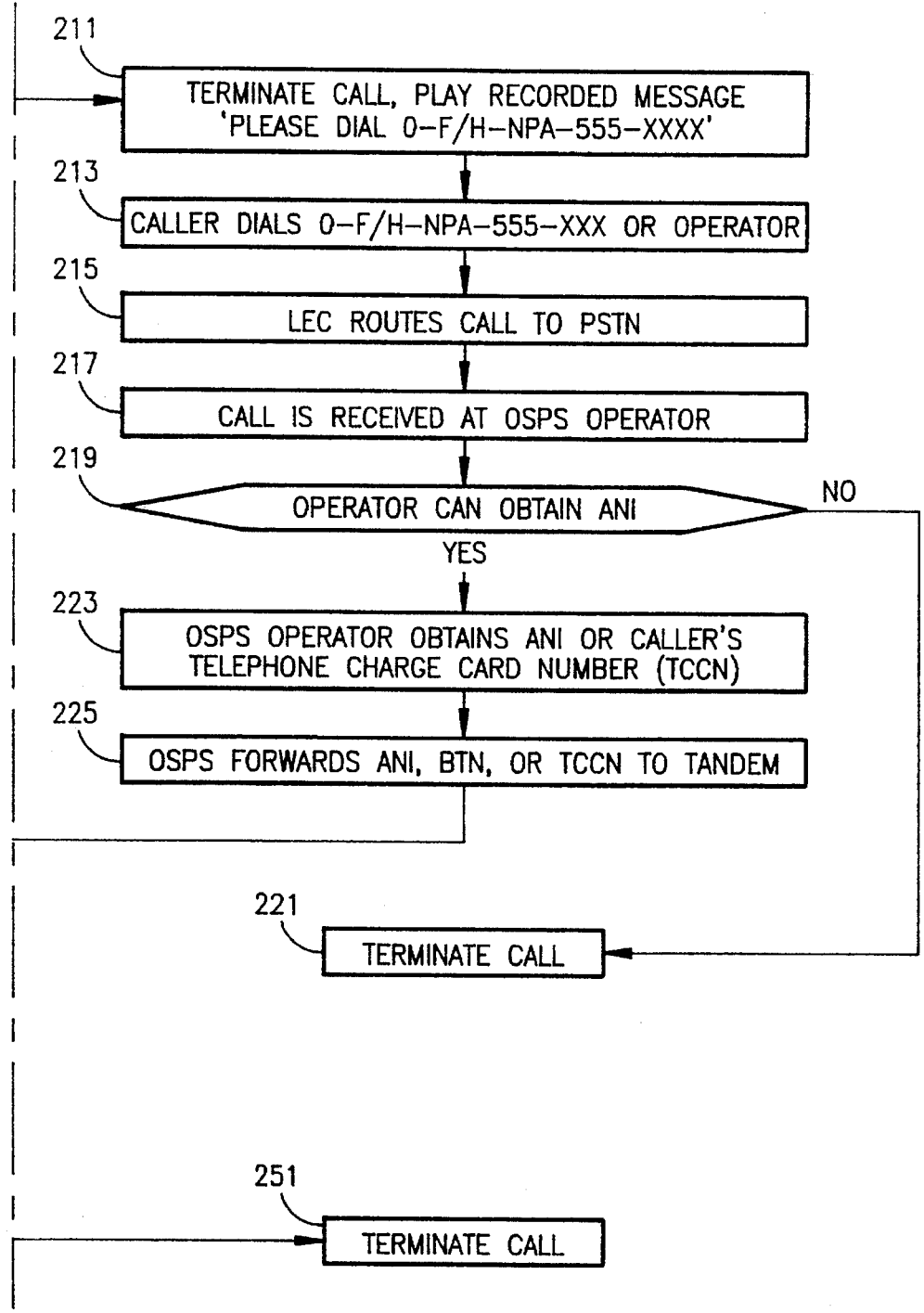

With joint reference to FIGS. 1 and 2, the inventive method and apparatus for the billing of a value-added communication call originated by a caller at station 103 and terminating at ESP 170 is described in more detail. One illustrative value-added communication service which the present invention may be adapted and utilized with, for example, is a service known as 555-Fax-It facsimile telecommunication service.

Note, while the present invention has been described for value-added service calls using 555 numbers, it should be understood that it may also be used with other telecommunication services.

Assume initially, in Step 201 shown in FIG. 2, that a caller at station 103 dials 555-XXXX (or local dialing plan) e.g., 1-(F/H-NPA) 555-XXXX where each of the X digits is any number between 0–9. F/H-NPA is the foreign or home numbering plan area. The caller may have been prompted to call a 555 number based on seeing or hearing an advertisement in various media.

In step 203, LEC 101 routes the call to PSTN 100 where it is sent to OTS 110. It should be noted that the originating LEC 101 may be either an Equal Access End Office (EAEO) or a NonConforming Office (NCO). An EAEO location has Automatic Number Identification (ANI) capability which enables the caller's number to be provided to OTS 110. The ANI number is required for billing the calling party for any calling charges and any value-added service charges.

If the caller's LEC 101 is an NCO location, ANI is not available and, hence, the caller's number must be obtained by using the assistance of an OSPS 120 operator.

The OTS 110 recognizes the dialed number as a value-added service number (e.g., a 555-Fax-It service call) and routes the call, in step 231, to Tandem 130 for further call processing. Tandem 130 determines from the incoming trunk group identity that the call is a direct-dialed call and not an operator-assisted call. Note, in an alternate embodiment, both direct-dialed (1-555-XXXX calls) and operator-assisted calls (0-555-XXXX calls) may be received at the Tandem 130, via OTS 110, without OSPS 120 intervention. In such a case, the Tandem 130 forwards calls to the OSPS 120. It should be noted that the operation of the present invention is the same for both of these embodiments.

In step 209, Tandem 130 determines whether an ANI number is received from OTS 110, if so, call processing continues in step 233; if not, the call is blocked or terminated with an appropriate message in step 211. An illustrative message (from announcement system 145) in step 211 informs the caller that "your call cannot be completed as dialed. Please redial your call as 0-F/H-NPA-555-XXXX", or a similar recorded announcement.

For direct-dialed calls which are blocked (i.e., those without ANI numbers) as well as those calls for which the caller desires operator assistance, the caller dials 0-F/H-NPA-555-XXXX (step 213). In this instance, the call bypasses step 211, whether or not ANI is present. LEC 101 identifies the call as a local access transport area network (Intra-LATA) call and routes the call to PSTN 100, in step 215. In step 217, the call is sent by LEC 101 to an OSPS 120 for operator assistance. The OSPS 120 identifies the call as a value-added service call, in step 219, by interpreting the dialed number. If the call is not a value-added call, then it is handled, in step 221, in the appropriate manner by OSPS 120. That is, the call may be appropriately completed or blocked.

If the call is recognized as a value-added call, OSPS 120 may automatically collect the caller's telephone number or telephone charge card number (billing telephone number, BTN) or may connect an operator to collect the caller's number. The caller's telephone number (ANI) or telephone charge card number will be used to bill charges incurred by the caller during the call.

Under the automatic card number collection procedure, in step 223, OSPS 120 provides a "bong" tone to the caller, and collects the telephone charge card number. In step 225, OSPS 120 forwards the telephone charge card number to the Tandem 130 for call processing. Note, some telephone charge cards use ANI plus a PIN (4-digit personal identification code) as the charge card validation. If the caller enters digits which correspond to the caller's Telephone Charge Card (TCC), these numbers are forwarded to the Tandem 130 for further call processing. Validation of these TCC numbers is performed within ABS/LIDB 190. If the caller does not enter the digits, the call is connected to an operator who obtains the caller's number (ANI) and/or TCC number (i.e., BTN), which is forwarded to the Tandem 130 for further call processing.

In step 231, the caller's LEC 101, depending on its equipment and business agreements with ESPs, may perform a dialed number routing look-up by accessing a Signal Control Point (SCP) 125 translation table within its local network to determine routing instructions prior to sending the call to the Tandem 130, as an alternative to accessing the SMS 180.

In step 233, Tandem 130 sends a query, a well-known process and query format, which includes the 7/10-digit dialed number (called party) and the ANI and/or billing number, over the CCS network 189 to SMS 180 Look-up Table 300. The CCS network 189 routes the query, based on the dialed number, to the appropriate Tandem-accessible data base within the SMS 180.

Figure 3A:
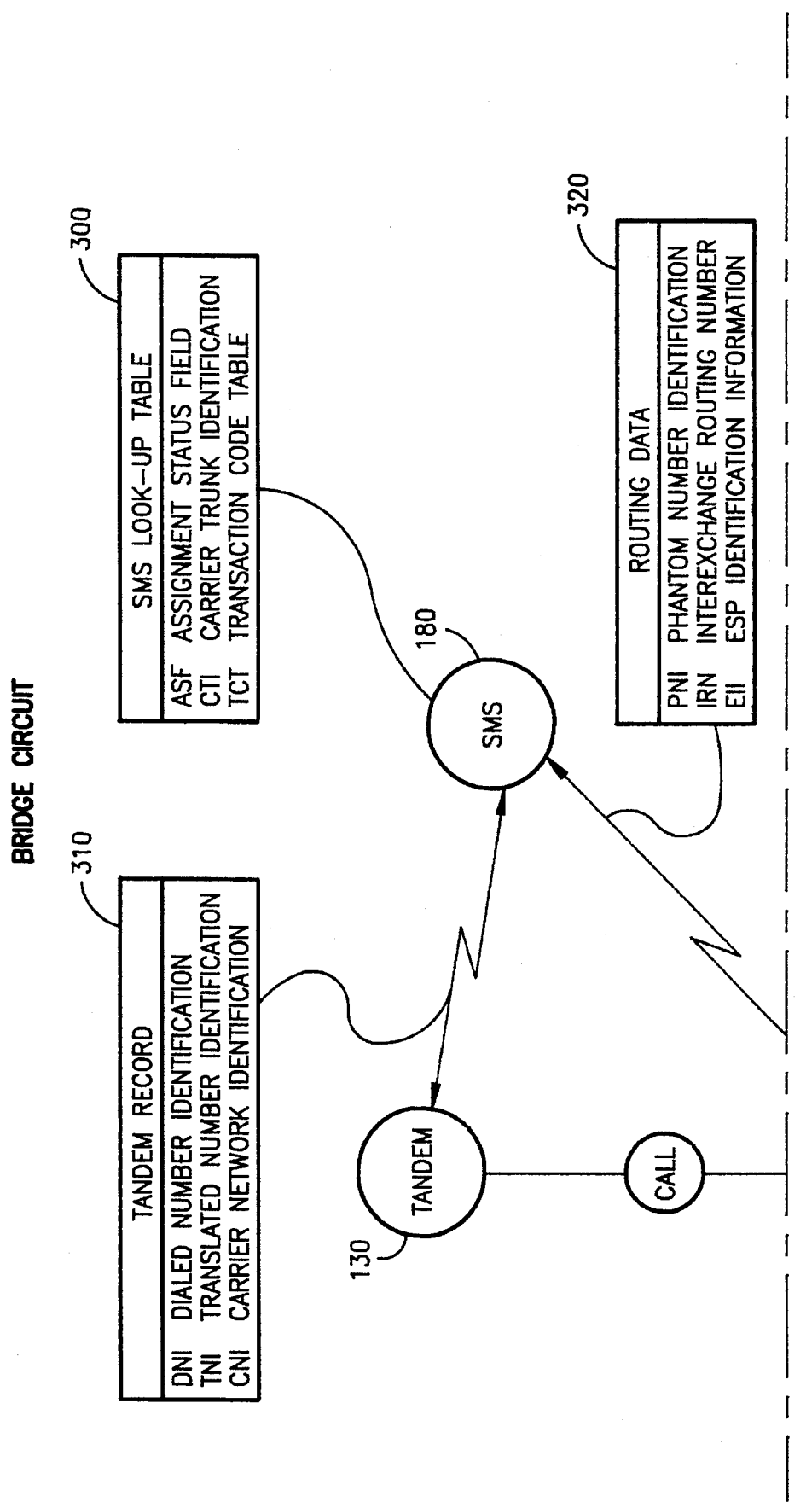

In step 239, SMS 180 uses the dialed number (DN) (555-XXXX) in a sequence described in the Bridge Circuit FIG. 3 to access the Tandem Record 310 side of the SMS 180 data base Look-up Table 300 to identify the Phantom Routing Number assigned to the dialed number and returns the Phantom Number Routing Data 320 to Tandem 130. In step 241, Tandem 130 transfers the call to the Routing Network 150 using the Phantom Number. The SMS 180 is a data base used in the PSTN by connecting carriers in sending and receiving In-Band Signaling 330 to support the requirement for 800 number portability. The function of the data base is to translate 800 numbers into network carrier address and routing address. Use of the SMS data base is described in a document entitled "Guidelines for 800 Data Base," previously referenced.

In step 243, upon receiving the call to the Phantom Number, the Routing Network 150 sends a query, which includes the Phantom Number and the ANI, via the CCS 189 to the SMS 180 which uses the Phantom Number to access the IXC side of the SMS data base to identify the TTS 160 to which the call is to be routed. In step 245, Routing Network 150 routes the call to the TTS/SN 160 serving the ESP location (e.g., ESP 170 in FIG. 1) as instructed by Routing Data 320 received from SMS 180. In step 247 TTS 160 connects ESP 170 to the Routing Network. In step 248 the Routing Network 150 sends a signaling message to the ESP 170, including the caller's identification, and translated IXC routing number. This information is sent over the Inband Equal Access Signaling Interface (IEASI) 179 with caller ID/billing information and DN. A caller's ID is defined herein to mean a network call identification number (which can be translated into the caller's station number), caller's station number, caller's billing number, a subaccount indicator (caller's subaccount number) or other identification which ensures that the proper party will be billed for the call. In response to the receipt of the ANI message, ESP 170 sends a response back to TTS 160 to indicate that the call identification information has been received (e.g., wink).

In step 249, ESP 170 validates caller's ANI in real-time through ABS/LIDB 190. In step 250, ESP 170 determines if all parameters are met to qualify the call as billable. In step 251, if the call is determined by ESP 170 to be unbillable, ESP 170 terminates the call. In step 260, ESP 170 collects the IXC routing number, caller ID and billing information, then outputs a service menu to the caller and signals answer supervision back through PSTN 100. When answer supervision is returned by the ESP 170, the Tandem 130 will start timing the call. Note, ESP 170 may also time the call connection for its own purposes.

In step 261, ESP 170 may offer caller certain options through an attendant or announcement circuit 176 at the ESP 170 by sending a greeting to the user and requesting that selections be made from a menu of various ESP 170 services available to the user. If ESP 170 uses an attendant, the attendant would recite the menu and collect the responses. If ESP 170 is automated, the menu selection process may use an interactive voice response format which enables the user to enter selections, using touch-tone entries at station 103, in response to voice queries from the ESP 170. The touch-tone receiver 177 would receive the user's selection. Alternatively, the ESP 170 may include speech recognition equipment 178 which can determine the user selections. Moreover, if the user station 103 includes a video display terminal or computer, a text message can be outputted to the caller. Additionally, if the user station 103 includes a facsimile machine, data in facsimile form can be sent thereto from ESP 170.

In step 262, after the attendant, touch-tone receiver 177 or speech recognizer 178 collects the caller's response, ESP 170 records appropriate EMI Billing Record 340 parameters for the call. The ESP 170 provides the caller with the desired information service requested by connecting the caller to an information consultant or by outputting information directly from a database (in voice, text or fax form). Note, according to another aspect of the invention, the caller may, during the call, request a connection to more than one ESP-provided feature or service, which could include the possibility of paying the caller a stipulated amount for providing the ESP with information in the form of answers to a survey or opinion poll. In such scenarios, the ESP 170 may bill or pay the caller at an Amount of Charge or Credit 421 which is appropriate for each of the services provided, in addition to any applicable call-rate charged up to that point.

The call-rate information would include the actual charges incurred by the caller, based on the caller-selected services provided by the ESP 170. The rate information may also be specified using a variety of call length and call rate parameter combinations.

FIG. 4 shows the ESP Billing Record. The ESP 170 may specify the call rate to vary with the time of day, day of week, and day of year as Rate Period/Class 424. The billing information may identify the type of call being billed as Service Name/Text Code 423 or Message Type 425 which may vary in accordance with the selection response (touch tone digits or voice) of services by the caller. Note, if the caller selects more than one ESP-provided service, then the billing record of FIG. 4 may require separate fields for Type of Additional Charge 427 and the Amount of Additional Charge 428 to store billing parameters for each service or feature selected by the caller.

The ESP 170 may also vary charges depending on the caller's geographic area. The ESP 170 may also permit the caller to directly specify billing charge, for example, where the ESP is a fund raiser and the user wants to make a donation to a charitable organization.

Returning now to the call flow description of FIG. 2. In step 262, when the call is terminated the ESP 170 creates an EMI Billing Record 340 shown in Bridge-Circuit FIG. 3. The EMI billing record structure has typical parameters therein which may be utilized to create an ESP Billing Record FIG. 4 for submission of charges for a value-added service (e.g., 555-Fax-It service). Some of the various parameters, Connect Time 422 and Date of Call 431, of the EMI structure are obtained from the Bridge-Circuit FIG. 3 as well as from the IEASI 179 information associated with the value-added call. The significant billing parameters in the EMI Billing Record FIG. 4 are the Billing Telephone Number (BTN) 429, Connect Time (CT) 422, Elapsed Time (ET) 432, and Service Name/Text Code (SN/TC) 423. The CT and the ET are the values determined by ESP 170 in step 262.

In step 263, Billing System 140 is sent the caller's combined value-added service bills in the form of an EMI billing record by modem or magnetic tape in a well-known manner. For calls originated through the originating toll switch 110 or through the OSPS 120, a caller's value-added service charges may appear on the telephone bill to station 103, on a third-party telephone bill, or on a telephone charge card bill. The caller's bill may also include the textual descriptors provided by the ESP 170 as part of the billing information. Alternatively, and not a part of this invention, ESP 170 may bill caller for delivered value-added services on a commercial credit card.

In step 264 the Billing System 140 processes the EMI records to create aggregate and detailed call volumes and traffic parameters (e.g., geographic, time of day, calls blocked, etc.). The billing system also calculates the aggregate and detailed breakdown of revenues either payable to or receivable from the ESP 170. The detailed EMI billing records also contain subaccount Indicators 426 provided by the SP on a per call basis. This allows the SP to bill their clients or process the billing records in an appropriate manner. Elements of ESP Billing Record FIG. 4 not numbered, represent EMI record fields pertaining to data that is specific to telephone company use in producing a Caller's Monthly Bill 264, and are not part of this invention. Further illustration of ESP Billing Record field descriptions are shown in SR-STS-000320 FIGS. 5a and 5b. The document SR-STS-00320 FIG. 5a and FIG. 5b is a billing specification adopted by Access Providers as a common input format for their billing systems.

The present invention may also be utilized to enable the ESP 170 to bill the caller for goods purchased over the telephone from the SP in addition to services provided by the SP. Furthermore, the invention may be utilized to accept caller-specified charges (e.g., donation made to a charity sponsor) which are entered by the caller, verified by the ESP 170, and incorporated in the EMI record.

The ESP 170 can accept rate changes in real time. In one example, assume that the ESP 170 is in the business of providing expert consultation services. When the caller makes a call and selects the SP's premium services, the caller may not wish to hear an answering machine. To better serve their clients, the SP might wish to set the service rate at a lesser amount when the experts are not available (making it, in effect, a minimum-rate call to the caller). When the experts are available, the SP might provide a means for the caller to select the premium expert rate. This improves the quality of the service to both caller and ESP 170.

In a second example, assume the SP is advertising their service using television media. If the SP is not sure what price the products will bear, the SP can run several ads offering different rates and determine the demand for the product at various price-points. This allows the SP to conduct "test marketing" of their goods and services.

The SP can specify different rates in ads ran in different geographical locations. This allows the SP to price their products differently in different regions. In doing so, they can stimulate their products in new regions of the country.

What has been described is merely illustrative of the application of the principles of the present invention. Other arrangements and methods can be implemented by those skilled in the art without departing from the spirit and scope of the appended claims.

What is claimed is:

1. A method for connecting a call through a long distance telephone network by dialing a seven-digit number from the local-dialed end of the public telephone network, that must be completed at the disparate long distance-dialed end of said network, said local-dialed end of said public telephone network being bridged to said long distance-dialed end of said network by a phantom-number bridging circuit, the method comprising the following steps:

dialing a 555-XXXX number assigned to a service provider, said number being dialed from a caller telephone;
   capturing the caller telephone number;
   sending a query to a first data base resident in the public telephone network;
   identifying a phantom routing number assigned to said service provider;
   transferring the call to a routing network using the phantom routing number;
   sending a query from the routing network to said first data base, the query including the phantom routing number and the caller telephone number;
   identifying a terminating toll switch servicing said service provider;
   routing the call to the identified terminating toll switch servicing said service provider;
   connecting said service provider to the routing network;
   sending call identification information to said service provider, including the caller telephone number and the phantom routing number;
   determining if the call is billable and validating the caller telephone number via a second data base resident in the public telephone network;
   presenting questions to the caller;
   providing information to said service provider in response to said questions; and
   sending a credit to the caller's bill in payment for providing information in response to said questions.

2. The method of claim 1 further including the steps of
   presenting a menu of items and billing rates to the caller;
   selecting one of the items and the corresponding billing rate; and
   sending a billing record to a billing and collection system.

3. The method of claim 2 wherein said local-dialed end of said public telephone network is bridged to said long distance-dialed end of said network by a phantom-number bridging circuit comprising the steps of:
   installing a ten-digit national-dialed number within the first data base software, which said ten-digit number is neither connected nor published, thereby becoming said phantom routing number of said phantom number bridging circuit;
   installing database software pointers relating said seven-digit local-dialed number to said phantom routing number within the local exchange carrier number look-up side of said first data base; and
   installing data base software pointers relating said ten-digit national-dialed number to said phantom routing number within the interexchange carrier number look-up side of said first data base.

4. The method of claim 3 wherein said phantom routing number and said software pointers are installed within said first data base comprising the steps of:
   computer-generating a relational data base record pointing said seven-digit local-dialed number to said phantom number;
   computer-generating a relational data base record pointing said ten-digit national-dialed number to said phantom routing number; and
   transmitting said relational data base records by computer modem, magnetic media or other appropriate method of transmission to the data entry port of said first data base.

5. The method of claim 1 wherein said call identification information is communicated to the service provider by in-band signaling circuits using a local exchange carrier routing message and a toll carrier routing message.

6. The method of claim 5 comprising the steps of:
   enabling said service provider to exercise the option of denying an unbillable call;
   enabling the caller to specify one or more services to be provided during said call; and
   enabling said service provider to render a separate service charge for each of said one or more services provided to the caller.

7. The method of claim 5 wherein said circuits facilitate receipt of requests for multiple services at various prices and receipt of separate billing information for each service delivered.

8. The method of claim 1 further comprising the step of compiling information for purposes of billing the caller for incurred charges by use of an exchange message interface billing record.

9. The method of claim 5 wherein said call identification information includes information specifying the type of service provided to the caller during said call.

10. The method of claim 1 wherein said method includes the step of creating a separate billing record specifying billing information for each connection to the service provider.

11. The method of claim 9 wherein said call identification information provided can be used to create textual descriptors which can be included as part of the billing record.

12. The method of claim 1 wherein said method includes the step of enabling the caller to specify one or more billing parameters during said call to be used to determine billing information.

13. The method of claim 12 wherein caller-specified billing parameters include a billing number for billing said charges incurred by the caller.

14. The method of claim 13 wherein said billing number is a number other than the call-originating number.

15. The method of claim 1 wherein said call identification information includes a calling charge rate per fixed time period.

16. The method of claim 1 wherein said call identification information includes an initial period charge parameter and an additional period charge parameter.

17. The method of claim 1 wherein said call identification information includes a fixed charge per call.

18. The method of claim 1 wherein said call identification information identifies the type of call to be billed.

19. The method of claim 1 wherein said call identification information includes the total charge incurred by the caller during said call.

20. The method of claim 1 wherein said credit to the callers bill includes a credit in payment for providing information in response to a survey or opinion poll.

21. The apparatus of claim 20 wherein said caller identification and billing information is communicated by separate transmission to the public telephone network billing system.

22. A method as in claim 1 including the step of reformatting data to bill a caller for charges incurred during a call made over disparate networks within the public switched telephone network to a called location comprising use of said network's exchange message interface.

23. Apparatus as in claim 20 which further comprises a means of including amounts on caller's monthly telephone bills to charge for service provider fees over and above the amounts billed for the telephone call transmission.

24. The method of claim 22 further comprising the step of using said exchange message interface to produce a service provider billing record.

25. The method of claim 22 wherein said service provider billing record is sent to the public telephone network by an appropriate means, including a modem.

* * * * *